US010283026B2

(12) United States Patent
Ishige et al.

(10) Patent No.: US 10,283,026 B2
(45) Date of Patent: May 7, 2019

(54) INSPECTION DEVICE OF DISPLAY DEVICE, METHOD OF INSPECTING MOTHER SUBSTRATE FOR DISPLAY DEVICE, AND DISPLAY DEVICE

(71) Applicant: Japan Display Inc., Minato-ku (JP)

(72) Inventors: Nobuyuki Ishige, Tokyo (JP); Satoru Tomita, Tokyo (JP)

(73) Assignee: Japan Display Inc., Minato-ku (JP)

( * ) Notice: Subject to any disclaimer, the term of this patent is extended or adjusted under 35 U.S.C. 154(b) by 74 days.

(21) Appl. No.: 15/171,346

(22) Filed: Jun. 2, 2016

(65) Prior Publication Data

US 2016/0363612 A1 Dec. 15, 2016

(30) Foreign Application Priority Data

Jun. 12, 2015 (JP) ................................ 2015-119028

(51) Int. Cl.

| | |
|---|---|
| ***G06F 3/041*** | (2006.01) |
| ***G06F 1/16*** | (2006.01) |
| ***G09G 3/00*** | (2006.01) |
| ***G09G 3/36*** | (2006.01) |
| *G06F 3/044* | (2006.01) |

(52) U.S. Cl.

CPC ........... *G09G 3/006* (2013.01); *G09G 3/3648* (2013.01); *G06F 3/044* (2013.01); *G06F 3/0416* (2013.01)

(58) Field of Classification Search

CPC ....... G02F 1/13452; G06F 2203/04112; G06F 3/0416; G06F 3/044; G09G 2300/0426; G09G 2310/0275; G09G 2330/04; G01R 31/2812

See application file for complete search history.

(56) References Cited

U.S. PATENT DOCUMENTS

2007/0097309 A1* 5/2007 Matsumoto ......... G02F 1/13452 349/149
2014/0111724 A1* 4/2014 Nishino ................ G02F 1/1309 349/43
2015/0177872 A1* 6/2015 Kim ........................ G06F 3/044 345/174

FOREIGN PATENT DOCUMENTS

| | | | |
|---|---|---|---|
| CN | 101140726 | A | 3/2008 |
| CN | 101750554 | A | 6/2010 |
| CN | 101995679 | A | 3/2011 |
| CN | 201796208 | U | 4/2011 |
| CN | 102054413 | A | 5/2011 |
| JP | 2003-43980 | | 2/2003 |
| JP | 2007-322428 | A | 12/2007 |

(Continued)

OTHER PUBLICATIONS

Office Action issued in corresponding Chinese Application No. 201610402580.6 dated Nov. 16, 2018, citing above AO-AS references, 31 pages (with English translation).

(Continued)

*Primary Examiner* — Alesa Allgood

(74) *Attorney, Agent, or Firm* — Oblon, McClelland, Maier & Neustadt, L.L.P.

(57) ABSTRACT

According to one embodiment, an inspection device of a display device, includes a first probe block which includes first probes, a probe block attachment which supports the first probe block to enable a position of the first probe block to be set variably, a signal source which supplies a signal to the first probes, and a transmission cable which connects the first probe block with the signal source.

7 Claims, 7 Drawing Sheets

(56) References Cited

FOREIGN PATENT DOCUMENTS

WO 2007/109375 A2 9/2007

OTHER PUBLICATIONS

Office Action issued in corresponding Japanese Application No. 2015/119028 dated Jan. 22, 2019, citing above AO-AP references, 6 pages (with English translation).

* cited by examiner

INSPECTION DEVICE OF DISPLAY DEVICE, METHOD OF INSPECTING MOTHER SUBSTRATE FOR DISPLAY DEVICE, AND DISPLAY DEVICE

CROSS-REFERENCE TO RELATED APPLICATIONS

This application is based upon and claims the benefit of priority from Japanese Patent Application No. 2015-119028, filed Jun. 12, 2015, the entire contents of which are incorporated herein by reference.

FIELD

Embodiments described herein relate generally to an inspection device of a display device, a method of inspecting a mother substrate for display device, and a display device.

BACKGROUND

Recently, display devices such as liquid crystal display devices and organic electroluminescent display devices have been put into practical use. In the manufacturing process of the display device, various operation inspections such as an illumination inspection are performed. The inspection device applied to the inspections needs to comprise probes to supply inspection signals together to pads formed in the display device. For example, technology of reducing the number of probes required for the inspections by integrally forming circuits for array inspection and circuits for cell inspection has been disclosed.

In contrast, if the number of channels of a signal source of the inspection device exceeds the total number of pads of the display device or the total number of probes of the inspection device or if the total number of pads or the pitch between the pads (or pad layout) is varied in accordance with product specifications, the probes need to be designed again and manufactured, which causes increase in the manufacturing costs and reduction in the inspection efficiency.

DETAILED DESCRIPTION

Figure 1:
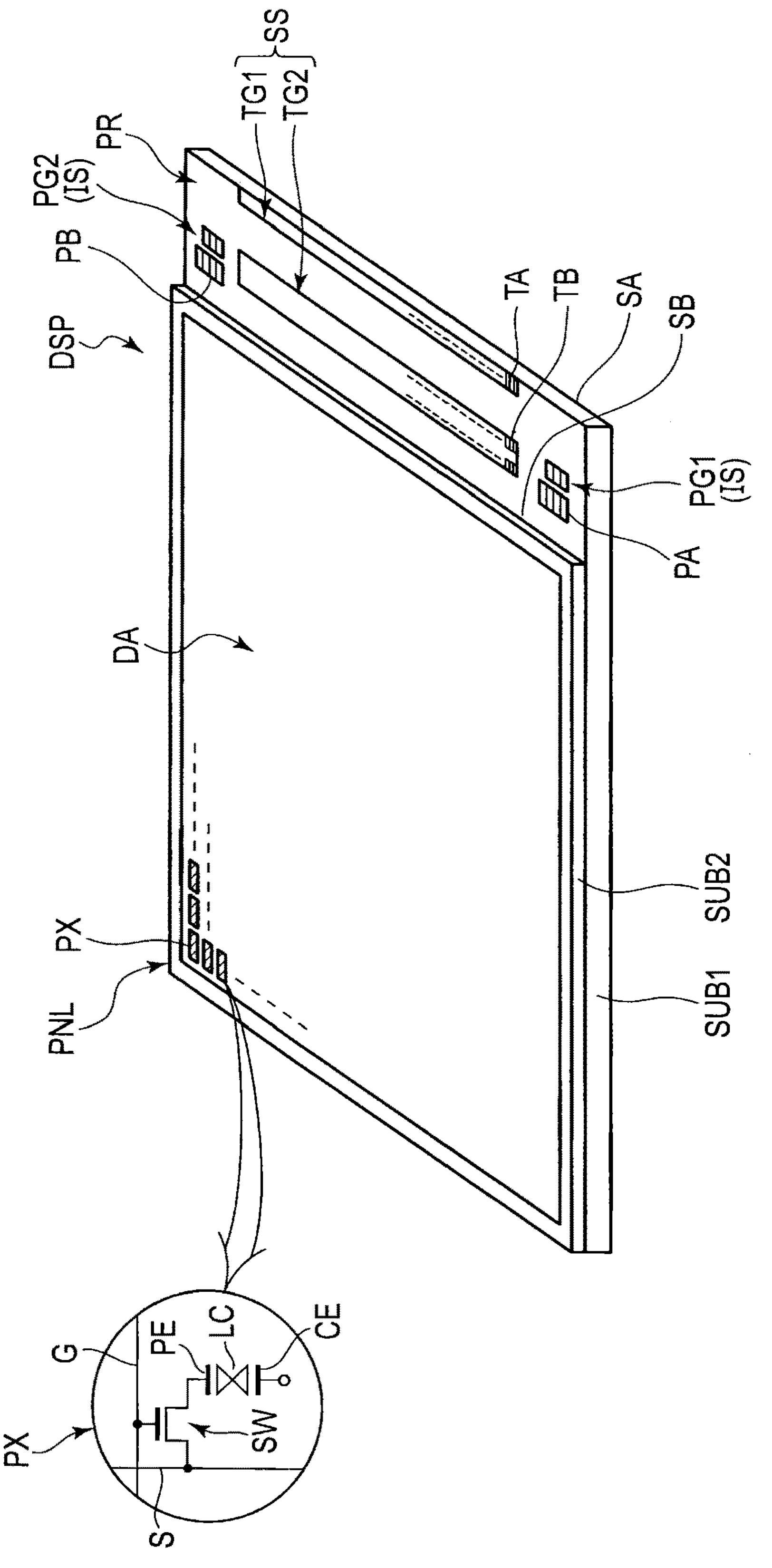
FIG. 1 is an illustration schematically showing a configuration of a display device DSP of the embodiments.

In general, according to one embodiment, an inspection device of a display device, includes: a first probe block which includes first probes; a probe block attachment which supports the first probe block to enable a position of the first probe block to be set variably; a signal source which supplies a signal to the first probes; and a transmission cable which connects the first probe block with the signal source.

According to another embodiment, a method of inspecting a mother substrate for a display device by an inspection device, the inspection device comprising: a first probe block which includes first probes; a second probe block which includes second probes; a probe block attachment which supports the first probe block and the second probe block to enable an interval between the first probe block and the second probe block to be set variably; a signal source; and a transmission cable which connects the first probe block and the second probe block with the signal source, the method comprising:

adjusting the interval between the first probe block and the second probe block in accordance with an interval between a first pad group including first pads disposed on the mother substrate and a second pad group spaced apart from the first pad group and including second pads; and urging the first probes and the second probes to contact the first pads and the second pads, respectively.

According to yet another embodiment, a display device including a display area and a peripheral area including pads for inspection, the pads for inspection including a first pad group composed of first pads and a second pad group composed of second pads, the first pad group and the second pad group being spaced apart from each other, the second pads being arranged at same pitches as the first pads.

Embodiments will be described hereinafter with reference to the accompanying drawings. Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures as compared to actual embodiments for the sake of simpler explanation, and they are not to limit the interpretation of the invention of the present application. Furthermore, in the specification and drawings, constituent elements having the same or similar functions as those described in connection with preceding drawings are denoted by like reference numerals and their duplicated detailed explanations may be omitted.

The display device of the embodiments can be applied to a liquid crystal display device comprising a liquid crystal element, a self-luminous display device comprising an organic electroluminescent (EL) display element and the like, an electronic paper display device comprising a cataphoretic element and the like, a display device employing micro-electromechanical systems (MEMS), or a display device employing electrochromism. The display device can be used for, for example, various devices such as smartphones, tablet terminals, mobile telephone terminals, personal computers, TV receivers, vehicle-mounted devices, and game consoles.

FIG. 1 is an illustration schematically showing a configuration of a display device DSP of the embodiments. A configuration of major portions necessary for explanations is illustrated.

The display device DSP comprises a plate-like display panel PNL. The display panel PNL includes a first substrate SUB1, and a second substrate SUB2 disposed to be opposed to the first substrate SUB1. The first substrate SUB1 and the second substrate SUB2 are attached to each other by a sealing member or the like.

The display panel PNL includes a display area DA on which an image is displayed, and a peripheral area PR located outside the display area DA. The display area DA is composed of pixels PX. The display area DA is shaped in a square in the example illustrated, but may be formed in any other polygons or other shapes such as a circle and an ellipsoid. The display panel PNL includes, in the display area DA, a gate line G, a source line S, a switching element SW electrically connected to the gate line G and the source line S in each pixel PX, a pixel electrode PE electrically connected to the switching element SW in each pixel PX, a common electrode CE opposed to the pixel electrode, and the like.

If the display device DSP is a liquid crystal display device, the display device DSP may be what is called a transmissive liquid crystal display device which displays an image by selectively transmitting the light made incident on the display panel PNL from a backlight unit, in each main pixel PX, a reflective liquid crystal display device which displays an image by selectively reflecting external light made incident on the liquid crystal display panel PNL from the outside, in each pixel PX, or a semi-transmissive liquid crystal display panel having the functions of both the transmissive liquid crystal display device and the reflective liquid crystal display device.

The details of the configuration of the display panel PNL are not explained here but, if the display panel PNL is a liquid crystal display panel holding a liquid crystal layer LC between the first substrate SUB1 and the second substrate SUB2, the display panel PNL may have a configuration corresponding to any one of a display mode using a longitudinal electric field along the normal line of the main surface of the substrate, a display mode using the oblique electric field angled with respect to the main surface of the substrate, and a display mode using an appropriate combination of the longitudinal electric field, the lateral electric field and the oblique electric field. In the display mode using the longitudinal electric field, for example, the first substrate SUB1 includes the pixel electrodes PE, and the second substrate SUB2 includes the common electrodes CE opposed to the pixel electrodes PE via the liquid crystal layer LC. In the display mode using the lateral electric field, for example, the first substrate SUB1 includes the pixel electrodes PE and the common electrodes CE.

On the display panel PNL illustrated, the peripheral area PR is formed in a frame shape surrounding the display area DA. The display panel PNL includes an inspection module IS and a signal supply module SS, in the peripheral area PR.

The inspection module IS comprises inspection pads which supply an inspection signal necessary for the operation inspection of the display device DSP. The operation inspection includes, for example, a quality inspection to inspect occurrence of a point defect (line short or line disconnection on the first substrate SUB1) before applying the second substrate SUB2 onto the first substrate SUB1, an illumination inspection to inspect normal illumination of each pixel after applying the second substrate SUB2 onto the first substrate SUB1, and the like. The inspection module IS comprises a first pad group PG1 composed of first pads PA and a second pad group PG2 composed of second pads PB, as the inspection pads. Details of the first pad group PG1 and the second pad group PG2 will be explained later.

The signal supply module SS is located between the first pad group PG1 and the second pad group PG2, in the peripheral area PR. The signal supply module SS comprises terminals to supply signals necessary for displaying image to the display device DSP. More specifically, the signal supply module SS comprises a first terminal group TG1 composed of first terminals TA and a second terminal group TG2 composed of second terminals TB. The first terminal group TG1 is formed along a side SA of the display device DSP of the first substrate SUB1. In the example illustrated, the side SA corresponds to a side of the first substrate SUB1. A side SB of the second substrate SUB2 is located more closely to the display area DA than the side SA. A signal supply source such as a flexible printed circuit is mounted on the first terminal group TG1. The second terminal group TG2 is formed between the side SA and the side SB. A signal supply source such as a driving IC chip is mounted on the second terminal group TG2.

Figure 2:
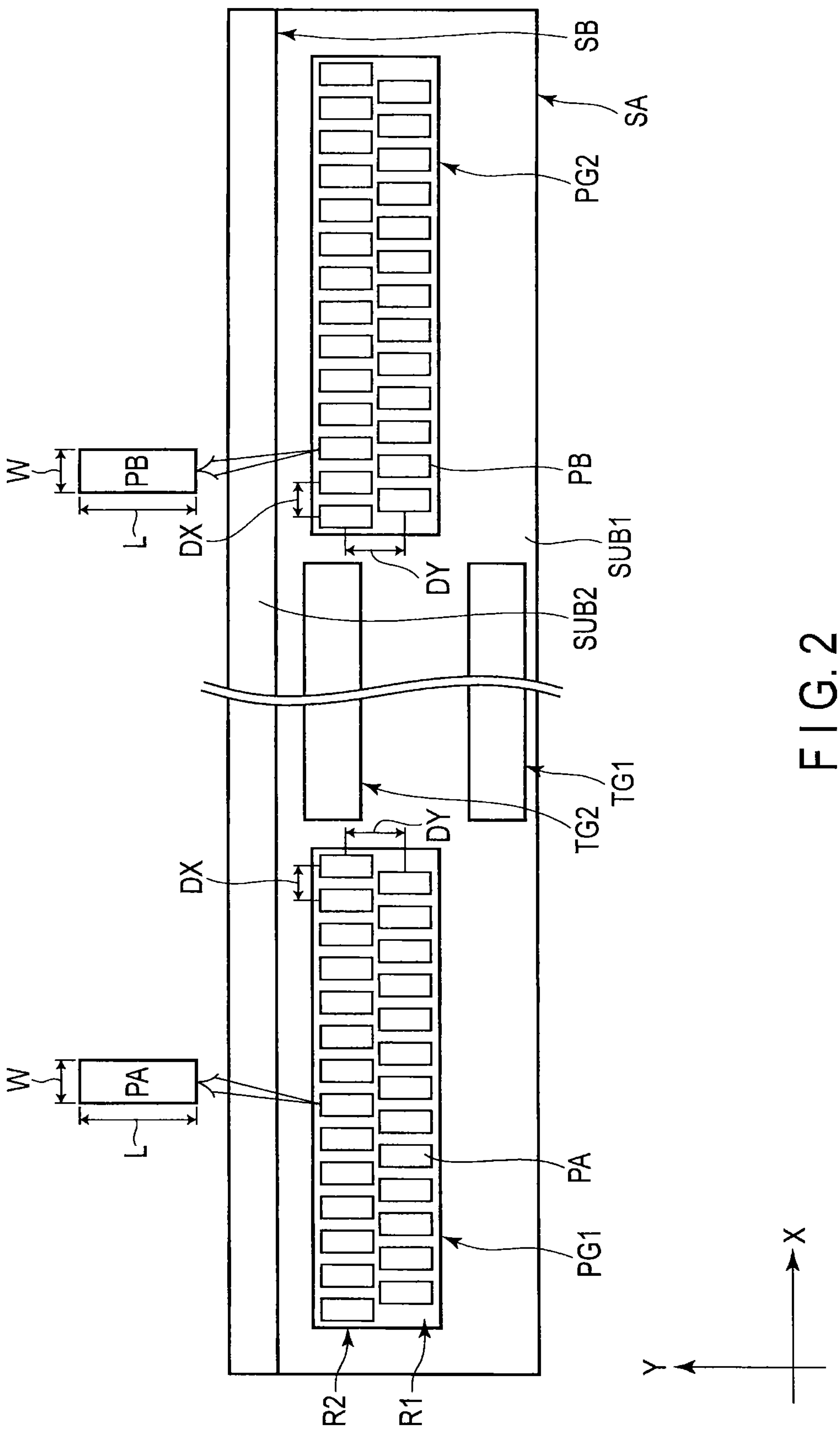
FIG. 2 is a plan view showing a configuration example of the first pad group PG1 and the second pad group PG2 shown in FIG. 1.

FIG. 2 is a plan view showing a configuration example of the first pad group PG1 and the second pad group PG2 shown in FIG. 1. In the example illustrated, a direction in which the sides SA and SB extend is referred to as a first direction X, and a direction intersecting the first direction X is referred to as a second direction Y.

In FIG. 2, the total number of the first pads PA in the first pad group PG1 is equal to the total number of the second pads PB in the second pad group PG2. In addition, the layout of the first pads PA in the first pad group PG1 is the same as the layout of the second pads PB in the second pad group PG2. The first pad group PG1 and the second pad group PG2 are located in the same straight line along the sides SA and SB.

Details of the configuration will be explained with reference to the first pad group PG1. In the example illustrated, the total number of the first pads PA is twenty-seven. The first pads PA are formed in a rectangular shape having a width W along the first direction X and a length L along the second direction Y as enlarged in the drawing. The first pads PA have a layout of being arranged in two rows in the second direction Y, which are a first row R1 located on a side close to the side SA and a second row R2 located on a side close to the side SB. The first row R1 includes thirteen first pads PA, and the first pads PA are arranged in the first direction X with equal pitches DX. The second row R2 includes fourteen first pads PA, and the first pads PA are arranged in the first direction X with equal pitches DX. The arrangement pitches DX of the first pads PA in the first row R1 and the second row R2 are equal to each other. The pitches DY along the second direction Y, of the first pads PA of the first row R1 and the first pads PA of the second row R2, are constant. The pitch DX corresponds to the interval along the first direction X, between the centers of the first pads PA, and the pitch DY corresponds to the interval along the second direction Y, between the centers of the first pads PA.

In the second pad group PG2, the second pads PB are arranged with the same pitches as the arrangement pitches DX and DY of the first pads PA. The second pads PB are formed in substantially the same shape as the first pads PA, having the same width W along the first direction X and the same length L along the second direction Y as the first pads PA, as enlarged in the drawing.

The first terminal group TG1 and the second terminal group TG2 are located between the first pad group PG1 and the second pad group PG2 in FIG. 2 but are not particularly limited, and either of the first terminal group TG1 and the second terminal group TG2 or none of the first terminal group TG1 and the second terminal group TG2 may be located between the first pad group PG1 and the second pad group PG2. In addition, the number of the first pads PA in the first pad group PG1 and the number of the second pads PB in the second pad group PG2 do not need to be equal to each other, but each of the numbers may be varied in accordance with the inspection items, inspection method, pixel array, extension of the inspection lines, and the like. In other words, the number of the probes arranged in a probe block and the number of the pads in each pad group may be different from each other. In addition, the first pads PA and the second pads PB are arranged in two rows in the second direction Y, but may be arranged in one row or in three rows or more. The number of rows of the first pad group PG1 and the number of rows of the second pad group PG2 may be different from each other. The first pad group PG1 and the second pad group PG2 are located in the same straight line along the sides SA and SB, but may be disposed on at least the same straight line along the direction of extension of the first terminal group TG1 or the direction of extension of the second terminal group TG2, on a panel in a shape other than the rectangular shape.

Figure 3:
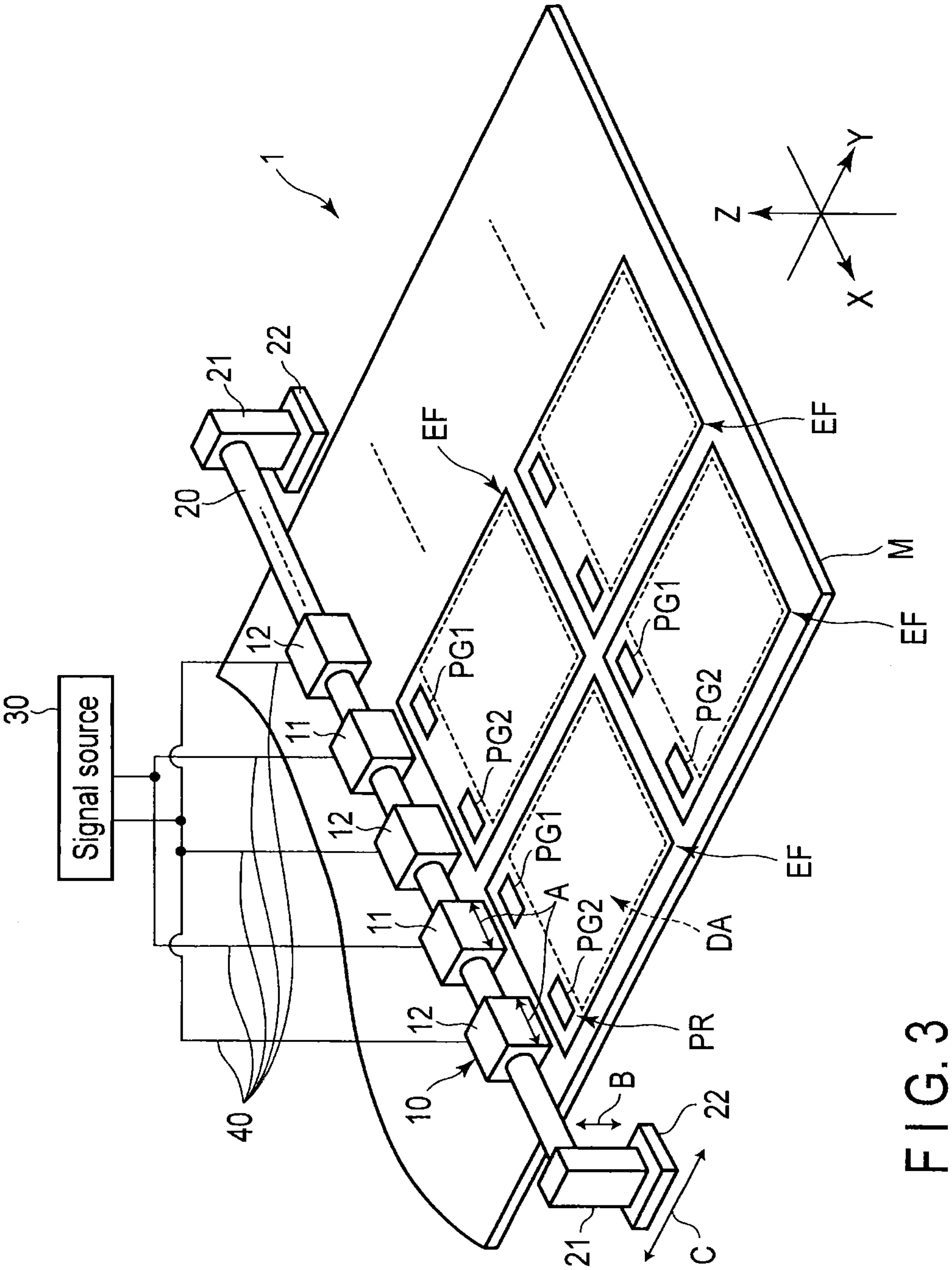
FIG. 3 is an illustration showing a configuration example of an inspection device 1 to inspect the display device DSP of the embodiments.

FIG. 3 is an illustration showing a configuration example of an inspection device 1 to inspect the display device DSP of the embodiments. The inspection device 1 of a mother substrate M for display device in which effective areas EF including the display areas DA and the peripheral areas PR are arranged will be explained as an example of the inspection device. In the example illustrated, the effective areas EF are arranged in the first direction X and the second direction Y, on the mother substrate M. In the peripheral area PR of each effective area EF, the first pad group PG1 and the second pad group PG2 corresponding to the inspection pads are formed. In the example illustrated, the mother substrate M is conveyed in the second direction Y.

The inspection device 1 comprises probe blocks 10, a probe block attachment 20, a signal source 30, a transmission cable 40 and the like. In the drawing, a direction intersecting the first direction X and the second direction Y is referred to as a third direction Z.

The probe blocks 10 have the same configuration and each probe block 10 includes probes. Details of the probe blocks 10 will be explained later. In the present embodiment, at least two probe blocks 10 are disposed for one effective area EF. In the example illustrated, two probe blocks are disposed for one effective area EF and, to distinguish them, they are referred to as a first probe block 11 and a second probe block 12. The first probe block 11 is spaced apart from the second probe block 12 at a particular interval. The first probe block 11 is opposed to the first pad group PG1 in the effective area EF, and the second probe block 12 is opposed to the second pad group PG2 in the effective area EF. The interval along the first direction X between the first probe block 11 and the second probe block 12 is equal to the interval along the first direction X between the first pad group PG1 and the second pad group PG2.

The probe block attachment 20 supports the probe blocks 10. The probe block attachment 20 extends along the first direction X and supports the first probe block 11 and the second probe block 12 to enable the interval between the probe blocks to be set variably. In other words, each of the first probe block 11 and the second probe block 12 is movable along a direction of an arrow A in the drawing parallel to the first direction X. In other words, the first probe block 11 and the second probe block 12 are moved along the probe block attachment 20, in accordance with the interval between the first pad group PG1 and the second pad group PG2 of the mother substrate M which is an inspection target. The interval between the first probe block 11 and the second probe block 12 can be adjusted in accordance with the interval between the first pad group PG1 and the second pad group PG2.

The probe block attachment 20 is connected to an elevating mechanism 21 and a sliding mechanism 22. The elevating mechanism 21 has a configuration of elevating the probe block attachment 20 along a direction of an arrow B in the drawing which is parallel to the third direction Z. The sliding mechanism 22 is configured to slide the probe block attachment 20 along a direction of an arrow C in the drawing which is parallel to the second direction Y.

A signal source 30 has a particular number of channels necessary for the inspection. In the signal source 30, the number of channels allocated to the first probe blocks is equal to the number of channels allocated to the second probe blocks.

The transmission cable 40 connects the signal source 30 with each of the first probe blocks 11 and the second probe blocks 12. The transmission cables 40 linking to the first probe blocks 11, of the transmission cables 40 connected to the signal line 30, are connected to the channels allocated to the first probe blocks in the signal source 30. Similarly, the transmission cables 40 linking to the second probe blocks 12, of the transmission cables 40 connected to the signal line 30, are connected to the channels allocated to the second probe blocks in the signal source 30.

Figure 4:
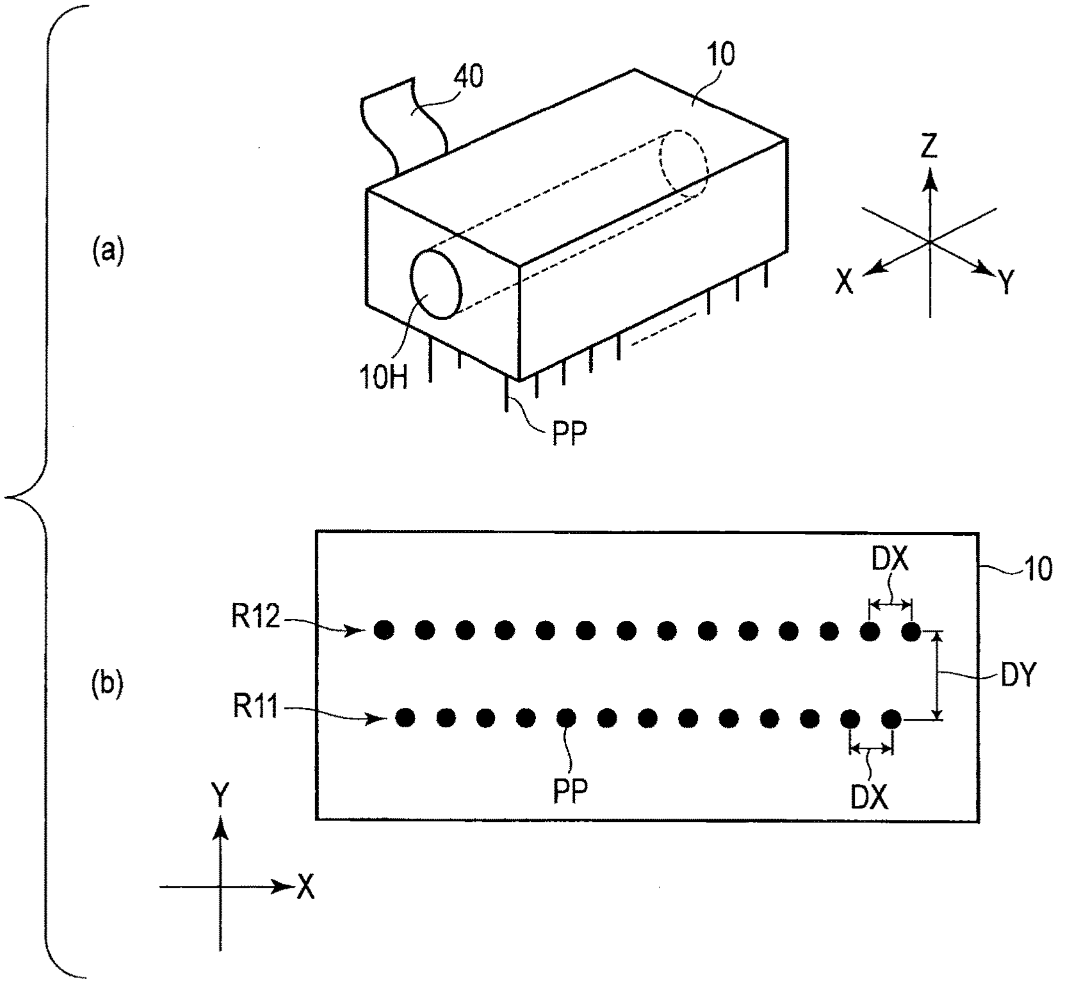
FIG. 4 is an illustration showing a configuration example of the probe block 10 applicable to the inspection device 1 shown in FIG. 3.

FIG. 4 is an illustration showing a configuration example of the probe block 10 applicable to the inspection device 1 shown in FIG. 3. In the drawing, (a) is a perspective view of the probe block 10 and (b) is a plan view of the probe block 10 seen from the probe side.

As shown in FIG. 4(*a*), the probe block 10 includes probes PP on its bottom surface. In the example illustrated, the probe block 10 is shaped in a rectangular parallelepiped and has a through-hole 10H in which the probe block attachment 20 is inserted. The transmission cable 40 is connected to the probe block 10.

As shown in FIG. 4(*b*), the probe block 10 includes the probes PP arranged in a particular layout, in an X-Y plane defined by the first direction X and the second direction Y. The layout of the probes PP is the same as the layout of the first pads PA in the first pad group PG1 shown in FIG. 2. Of course, the layout of the probes PP is also the same as the layout of the second pads PB in the second pad group PG2. In other words, the total number of the probes PP is equal to the total number of the first pads PA, i.e., twenty-seven in the example illustrated. The probes PP have a layout of being arranged in two rows in the second direction Y, which are a first row R11 and a second row R12 opposed to the first row R1 and the second row R2 of the first pads PA shown in FIG. 2, respectively. The first row R11 includes thirteen probes PP, and the probes PP are arranged in the first direction X with equal pitches DX. The second row R12 includes fourteen probes PP, and the probes PP are arranged in the first direction X with equal pitches DX. The arrangement pitches DX of the probes PP in the first row R11 and the second row R12 are equal to each other. The pitches DY along the second direction Y, of the probes PP of the first row R11 and the second row R12, are constant. The pitch DX corresponds to the pitch DX along the first direction X, of the first pads PA, and the pitch DY is equal to the pitch DY along the second direction Y, of the first pads PA.

The probe block 10 has the same configuration as the first probe block 11 and the second probe block 12 shown in FIG. 3. In other words, the total number of the probes PP in the first probe block 11 corresponding to the first pad group PG1 is equal to the total number of the probes PP in the second probe block 12 corresponding to the second pad group PG2 and is, for example, twenty-seven. The layout of the probes PP in the first probe block 11 is the same as the layout of the probes PP in the second probe block 12. In other words, the probes PP in the second probe block 12 are arranged with the same pitches as the arrangement pitches of the probes PP in the first probe block 11.

Next, an example of the inspection method applicable to the above-explained inspection device 1 will be explained with reference to the drawings.

Figure 5:
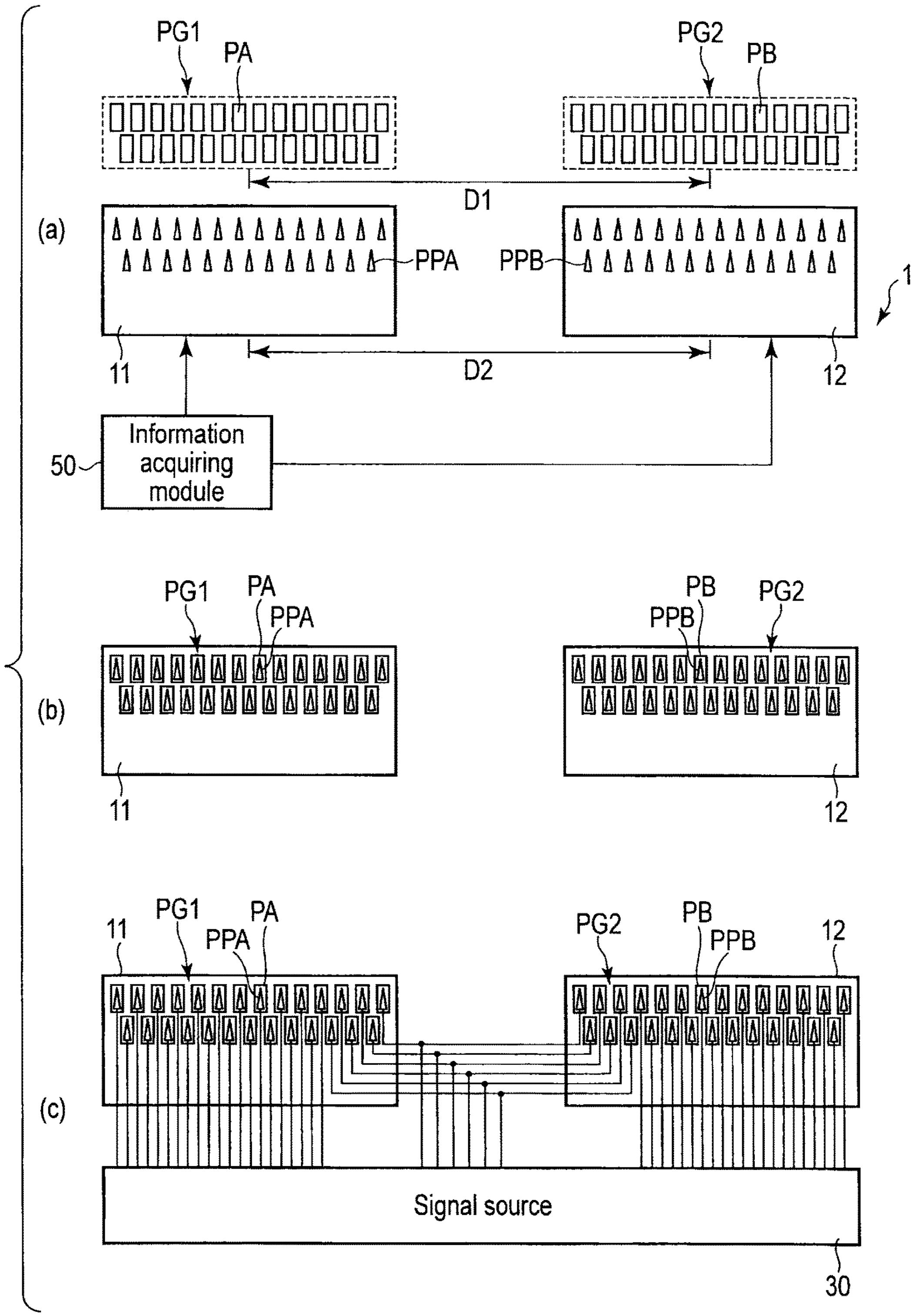
FIG. 5 is an illustration for explaining an inspection method applicable to the inspection device 1 of the embodiments.

FIG. 5 is an illustration for explaining an inspection method applicable to the inspection device 1 of the embodiments.

First, as shown in FIG. 5(*a*), an interval D2 between the first probe block 11 and the second probe block 12 is adjusted in accordance with an interval D1 between the first pad group PG1 and the second pad group PG2. At this time, the first probe block 11 and the second probe block 12 are slid along the probe block attachment 20, and the interval D2 between the probe blocks is adjusted to be equal to the interval D1. For example, the inspection device 1 may comprise an information acquiring module 50 which acquires information necessary to adjust the interval D2 between the first probe block 11 and the second probe block 12. The information acquiring module 50 can acquire, for example, necessary information by optically reading positions of the first pad group PG1 and the second pad group PG2 of the mother substrate M. Alternatively, the information acquiring module 50 can acquire necessary information by reading identification information (the lot number and the like) of the mother substrate M from the mother substrate M. Alternatively, the information acquiring module 50 can acquire necessary information, based on information input by an operator. In the inspection device 1, the first probe block 11 and the second probe block 12 are driven based on the information acquired by the information acquiring module 50, and are moved to particular positions, respectively.

The interval D1 corresponds to the distance (or pitch) between the centers of the first pad group PG1 and the second pad group PG2, and the interval D2 corresponds to the distance (or pitch) between the centers of the first probe block 11 and the second probe block 12. As shown in the drawing, the total number of the first probes PPA in the first probe block 11 is equal to the total number of the first pads PA in the first pad group PG1, and the total number of the second probes PPB in the second probe block 12 is equal to the total number of the second pads PB in the second pad group PG2. As explained above, however, the total number of the probes in each probe block may be different from the total number of the pads in the corresponding pad group.

Next, as shown in FIG. 5(*b*), the first probes PPA in the first probe block 11 are urged to contact the first pads PA in the first pad group PG1, and the second probes PPB in the second probe block 12 are urged to contact the second pads PB in the second pad group PG2. At this time, the sliding mechanism 22 moves the probe block attachment 20 such that the first probe block 11 and the second probe block 12 are located just above the first pad group PG1 and the second pad group PG2, respectively. The elevating mechanism 21 urges the probe block attachment 20 to move down and urges the first probes PPA and the second probes PPB to contact the first pads PA and the second pads PB, respectively.

Next, as shown in FIG. 5(*c*), inspection signals are supplied from the channels of the signal source 30 to the first probes PPA and the second probes PPB, respectively. In the embodiments, the number of the channels of the signal source 30 is smaller than a sum of the total number of the first probes PPA and the total number of the second probes PPB or a sum of the total number of the first pads PA and the total number of the second pads PB. For this reason, the signal source 30 supplies the inspection signal output from at least one channel to both the first probe block 11 and the second probe block 12 at the same timing. Necessary inspection signals can be thereby supplied from the signal source 30 including the limited number of channels to all the probes.

In the example illustrated, the sum of first probes PPA and the second probes PPB (or the sum of the first pads PA and the second pads PB) is fifty-four. In contrast, the number of channels of the signal source 30 is forty-eight, smaller than the total number of probes (or the total number of pads). For this reason, the probes supplied with the common inspection signal, in the first probe block 11 and the second probe block 12, are connected to the same channel in the signal source 30.

For example, six first pads PA located on the side close to the second pad group PG2, in the first pad group PG1, and six second pads PB located on the side close to the first pad group PG1, in the second pad group PG2, correspond to the common pads supplied with the same inspection signals at the same timing. In the signal source 30, six channels are allocated to six sets of common pads. In other words, all of forty-eight channels of the signal source 30 are allocated to twenty-one first pads PA in the first pad group PG1, twenty-one second pads PB in the second pad group PG2, and six sets of common pads. The signal source 30 supplies the inspection signals from the channels to the probes, respectively. The inspection signals are supplied from the probes to the pads, respectively.

The channels which can be made common or pads are supplied with, for example, fixed potential signals input to the common electrodes CE, pulse signals input to the common electrodes CE, fixed potential signals necessary to drive the gate lines, pulse signals for aging, clock signals, enable signals, selector signals and the like, as the inspection signals. The arrangement of the channels which can be made common or pads is not limited to the example illustrated.

After that, when the inspection is ended, the elevating mechanism 21 urges the probe block attachment 20 to move up and urges the first probes PPA and the second probes PPB to move away from the first pads PA and the second pads PB, respectively. The sliding mechanism 22 moves the probe block attachment 20 to a next inspection target.

According to the embodiments, the display device comprises the first pad group composed of the first pads, and the second pad group composed of the same number of the second pads as the first pads, and the second pads are arranged at the same pitches as the first pads. For this reason, the inspection device which supplies the inspection signals to the display device can supply the inspection signals to the first pad group and the second pad group by applying the probe blocks of the same configuration as the first probe block and the second probe block.

If the first pad group and the second pad group have difference configurations, the inspection device needs to comprise probe pads applied to each of the first pad group and the second pad group, and at least two types of probe blocks need to be designed and manufactured. According to the embodiments, the first probe block and the second probe block can be provided by designing and manufacturing one type of probe block, and the manufacturing costs can be reduced. In addition, since the same probe blocks are applicable irrespective of specifications of the display device, the inspection can be performed at a prototyping stage of a new product of the display device, and the inspection efficiency can be improved.

In addition, even in the inspection device comprising the signal source of the smaller number of channels than the total number of probes necessary for the inspection (or the total number of the first pads in the first pad group and the second pads in the second pad group), the signal source supplies the inspection signal output from at least one channel to both the first probe block and the second probe block at the same timing. In other words, the probes supplied with the common inspection signal are connected to the same channel, in the signal source. For this reason, the channels of the signal source can be made common and the display device can be inspected with the limited number of channels of the signal source.

In addition, in the display device, the first probe block and the second probe block are supported so as to enable the interval between the probe blocks to be set variably. For this reason, even if the interval between the first pad group and the second pad group is varied on each mother substrate which is the inspection target, any mother substrate can be inspected by adjusting the interval between the first probe block and the second probe block.

Furthermore, the number of the probe blocks can be increased or decreased in the inspection device. For this reason, even if the number of targets of inspection is varied for each mother substrate which is the inspection target, any mother substrate can be inspected by adjusting the number of the probe blocks.

Various types of mother substrate M will be explained as targets of inspection for the inspection device 1 of the embodiments.

Figure 6:
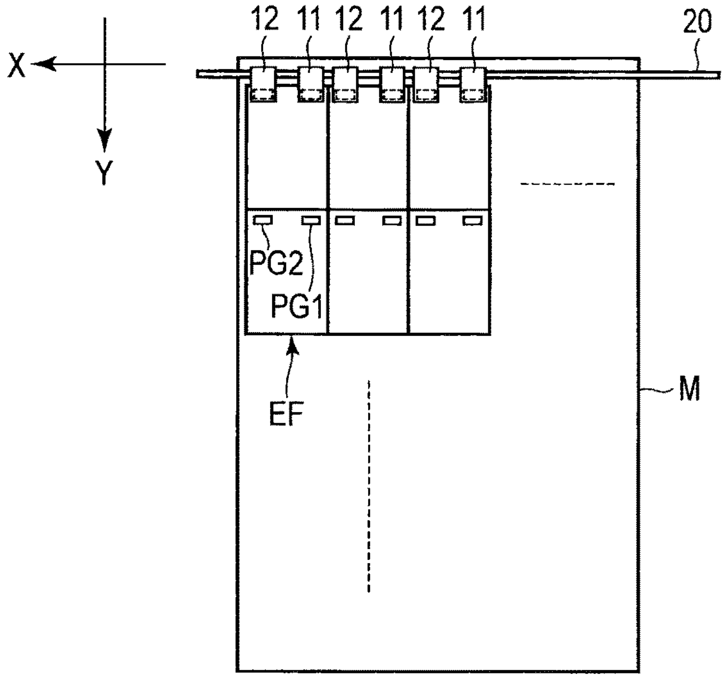
FIG. 6 is an illustration showing a configuration example of a mother substrate M which is an inspection target of the inspection device 1 of the embodiments.

The mother substrate M shown in FIG. 6 is shaped in a rectangle having a length along the first direction X shorter than a length along the second direction Y. The effective area EF formed on the mother substrate M is shaped in a rectangle having a length along the first direction X shorter than a length along the second direction Y.

Figure 7:
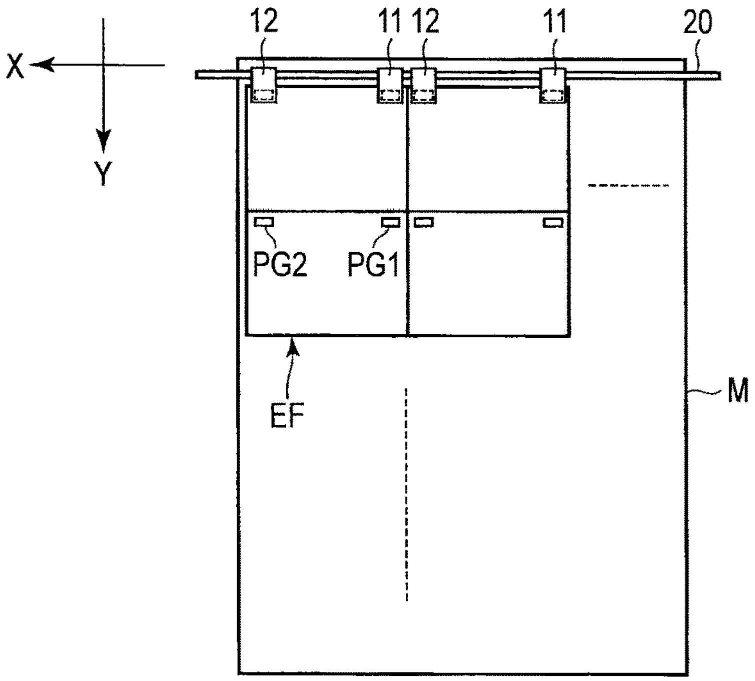
FIG. 7 is an illustration showing another configuration example of the mother substrate M which is an inspection target of the inspection device 1 of the embodiments.

The mother substrate M shown in FIG. 7 is shaped in a rectangle having a length along the first direction X shorter than a length along the second direction Y. The effective area EF formed on the mother substrate M is shaped in a rectangle having a length along the first direction X greater than a length along the second direction Y.

Figure 8:
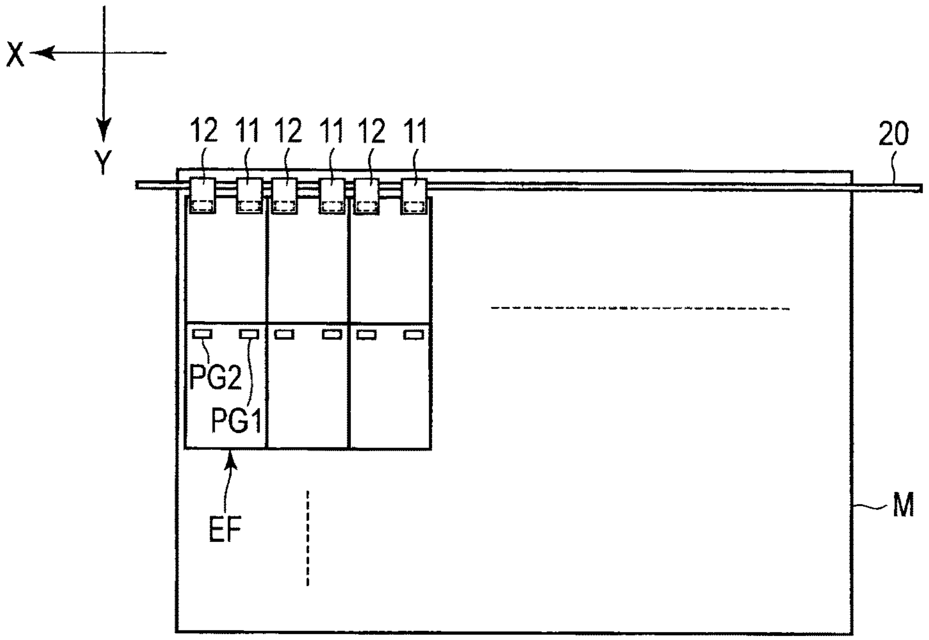
FIG. 8 is an illustration showing yet another configuration example of the mother substrate M which is an inspection target of the inspection device 1 of the embodiments.

The mother substrate M shown in FIG. 8 is shaped in a rectangle having a length along the first direction X greater than a length along the second direction Y. The effective area EF formed on the mother substrate M is shaped in a rectangle having a length along the first direction X shorter than a length along the second direction Y.

Figure 9:
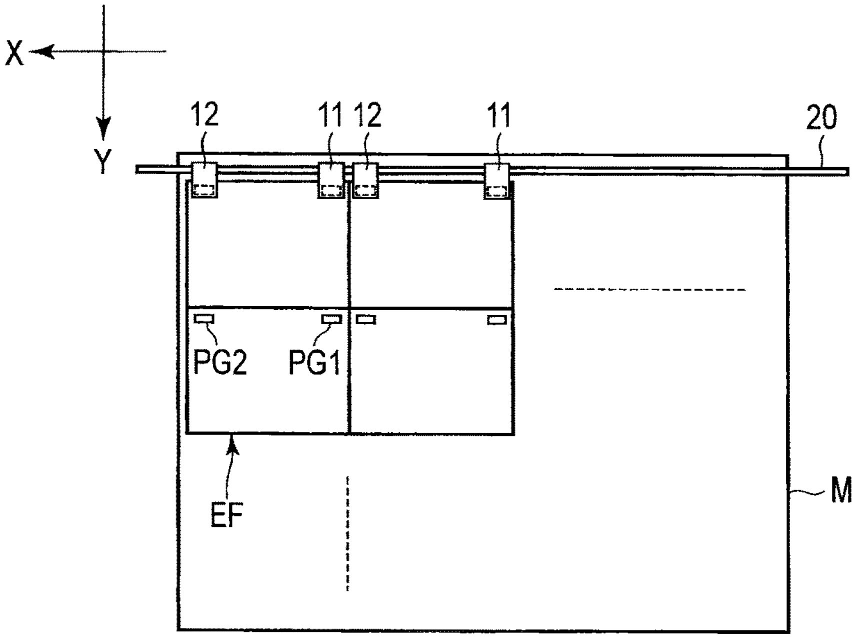
FIG. 9 is an illustration showing yet another configuration example of the mother substrate M which is an inspection target of the inspection device 1 of the embodiments.

The mother substrate M shown in FIG. 9 is shaped in a rectangle having a length along the first direction X greater than a length along the second direction Y. The effective area EF formed on the mother substrate M is shaped in a rectangle having a length along the first direction X greater than a length along the second direction Y.

In any one of the mother substrate M, the first pad group PG1 and the second pad group PG2 formed in the effective area EF have the same configuration. For this reason, according to the inspection device 1 of the embodiments, the inspection can be performed without changing the probe blocks, by adjusting the interval between the first probe block 11 and the second probe block 12 in accordance with the interval between the first pad group PG1 and the second pad group PG2, irrespective of dimensions of the mother substrate M and dimensions of the effective area EF.

One effective area includes two pad groups and the inspection is performed by using two probe blocks for the effective area in the above-explained examples, but if one effective area includes at least three pad groups, the inspection is performed by using at least three probe blocks for the effective area. In this case, too, the probes supplied with the same inspection signal, in each probe block, are connected to the same channel in the signal source and become capable of inspecting each effective area with the limited number of channels of the signal source. Of course, the inspective device can also be used in a case where one effective area includes one pad groups and the inspection is performed by using one probe block for the effective area.

According to the embodiments, as described above, the inspective device of the display device capable of reducing the costs and improving the inspection efficiency, the method of inspecting the mother substrate for the display device, and the display device can be provided.

While certain embodiments have been described, these embodiments have been presented by way of example only, and are not intended to limit the scope of the inventions. For example, the probes are arranged in the same configuration in at least two probe blocks used for one effective area, in the embodiments, but the configuration is not particularly limited but the arrangement of the probes and the number of the probes can be varied. In addition, the pitches of the probes and the pitches of the pads do not need to be the same, but pitches of some pads and probes can be varied in one of the pad groups or one of the probe blocks. Two pad groups are disposed for one effective area corresponding to one display panel and the inspection is preformed by using two probe blocks (i.e., a set of probe blocks) in the embodiments, but at least two effective areas may be connected by the lines on the board, and at least two effective areas may be inspected by using a set of probe blocks. The novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:

1. A display device including a display area and a peripheral area, the peripheral area including terminals on which a signal supply source is mounted, and which are supplied with signals for displaying image to the display area; and inspection pads supplied with inspection signals for inspecting a defect or illumination of the display area, wherein the inspection pads include a first inspection pad group composed of first inspection pads and a second inspection pad group composed of second inspection pads, the first inspection pad group and the second inspection pad group are spaced apart from each other, the terminals are disposed between the first inspection pad group and the second inspection pad group, the second inspection pads are arranged at same pitches as the first inspection pads, the first inspection pads of the first inspection pad group are located on a first straight line along a side of the display device, a distance from each of the first inspection pads to the side of the display device is a first distance, the second inspection pads of the second inspection pad group are located on a straight line extending from the first straight line to allow a first probe block and a second probe block to move along a line parallel to the first straight line, the first probe block configured to bring a first inspection probe into contact with each of the first inspection pads, the second probe block configured to bring a second inspection probe into contact with each of the second inspection pads, and a distance from each of the second inspection pads to the side of the display device is the first distance.

2. The display device of claim 1, wherein the number of the first inspection pads in the first inspection pad group is equal to the number of the second inspection pads in the second inspection pad group.

3. The display device of claim 1, wherein the first inspection pad group and the second inspection pad group are spaced apart from a signal supply source.

4. The display device of Claim 1, wherein signals supplied to a common electrode formed in the display area are capable of being supplied commonly to some of the first inspection pads and some of the second inspection pads.

5. The display device of claim 1 further comprising:

a first substrate including the terminals and the inspection pads, and a second substrate opposed to the first substrate, wherein the display area is located in an area where the first substrate and the second substrate overlap, a first side of the second substrate is located between the display area and a first side of the first substrate, the terminals and the inspection pads are located between the first side of the first substrate and the first side of the second substrate, and the inspection pads overlap neither of an IC chip and a flexible printed circuit.

6. The display device of claim 5, wherein a total number of the first inspection pads arranged in a first row located on a side close to the first side of the first substrate, is different from a total number of the first inspection pads arranged in a second row located on a side close to the first side of the second substrate.

7. The display device of claim 6, wherein a total number of the first inspection pads arranged in the first row, is same as a total number of second inspection pads arranged in the first row, and a total number of the first inspection pads arranged in the second row, is same as a total number of second inspection pads arranged in the second row.

* * * * *